(12) United States Patent
Niitsuma et al.

(10) Patent No.: US 10,787,104 B2
(45) Date of Patent: Sep. 29, 2020

(54) CONVEYANCE SEAT UNIT

(71) Applicant: TS TECH CO., LTD., Asaka-shi, Saitama (JP)

(72) Inventors: Kenichi Niitsuma, Tochigi (JP); Naoki Tamura, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 178 days.

(21) Appl. No.: 15/572,922

(22) PCT Filed: May 10, 2016

(86) PCT No.: PCT/JP2016/063918
§ 371 (c)(1),
(2) Date: Nov. 9, 2017

(87) PCT Pub. No.: WO2016/181972
PCT Pub. Date: Nov. 17, 2016

(65) Prior Publication Data
US 2018/0134188 A1 May 17, 2018

(30) Foreign Application Priority Data

May 11, 2015 (JP) .................................. 2015-096624

(51) Int. Cl.
*B60N 2/427* (2006.01)
*B60N 2/80* (2018.01)
(Continued)

(52) U.S. Cl.
CPC ............. *B60N 2/427* (2013.01); *B60N 2/002* (2013.01); *B60N 2/42709* (2013.01); *B60N 2/80* (2018.02);
(Continued)

(58) Field of Classification Search
CPC .... B60N 2/42709; B60N 2/427; B60N 2/002; B60N 2/865; B60N 2/888; B60N 2/80;
(Continued)

(56) References Cited

U.S. PATENT DOCUMENTS

| 5,694,320 A | * | 12/1997 | Breed | ................ | B60N 2/002 |
| | | | | | 701/45 |
| 2006/0186713 A1 | * | 8/2006 | Breed | ............... | B60N 2/0232 |
| | | | | | 297/216.12 |

(Continued)

FOREIGN PATENT DOCUMENTS

| JP | 2005-261697 A | 9/2005 |
| JP | 2009-190430 A | 8/2009 |

(Continued)

OTHER PUBLICATIONS

Office Action issued in related application JP 2015-096624, dated Apr. 16, 2019, with machine generated English language translation, 16 pages.

Primary Examiner — Milton Nelson, Jr.
(74) Attorney, Agent, or Firm — Faegre Drinker Biddle & Reath LLP

(57) ABSTRACT

A conveyance seat unit lessens a neck load applied to an occupant based on body shape, sex, or the like of the occupant when a rear load acts on a conveyance. The conveyance seat unit includes: a seat having a support portion that supports the occupant from behind; a state adjustment mechanism configured to adjust a state of a neck load adjustment portion, of the support portion, that affects the neck load applied to the occupant when the rear load acts on the conveyance; and an electronic control unit (ECU) that controls the state adjustment mechanism. The ECU acquires occupant information on the body and the sex of the occupant and controls the state adjustment mechanism according to the acquired occupant information to change the state of (Continued)

the neck load adjustment portion, which has been adjusted by the state adjustment mechanism, according to the content of the occupant information.

11 Claims, 12 Drawing Sheets

(51) Int. Cl.
 *B60N 2/90* (2018.01)
 *B60N 2/888* (2018.01)
 *B60N 2/865* (2018.01)
 *B60N 2/00* (2006.01)
 *G06K 9/00* (2006.01)

(52) U.S. Cl.
 CPC .............. *B60N 2/865* (2018.02); *B60N 2/888* (2018.02); *B60N 2/90* (2018.02); *G06K 9/00362* (2013.01)

(58) Field of Classification Search
 CPC .......... B60N 2/90; B60N 2/68; B60N 2/4214; G06K 9/00362; G06K 9/00838
 USPC ........................................ 297/216.13, 216.12
 See application file for complete search history.

(56) References Cited

U.S. PATENT DOCUMENTS

| | | | | |
|---|---|---|---|---|
| 2007/0176473 A1* | 8/2007 | Sakai | ..................... | B60N 2/002 297/216.12 |
| 2008/0036186 A1* | 2/2008 | Schockmel | ............ | B60N 2/888 280/735 |
| 2009/0062989 A1* | 3/2009 | Sakai | ..................... | B60N 2/002 701/45 |
| 2010/0264704 A1* | 10/2010 | Yasuda | ................ | B60N 2/4228 297/216.12 |
| 2010/0314918 A1* | 12/2010 | Alexander | ............ | B60N 2/862 297/216.12 |
| 2015/0321590 A1 | 11/2015 | Mizoi et al. | | |

FOREIGN PATENT DOCUMENTS

| | | |
|---|---|---|
| JP | 2010-173613 A | 8/2010 |
| JP | 2010-179884 A | 8/2010 |
| JP | 2014-104865 A | 6/2014 |
| JP | 2014-139069 A | 7/2014 |
| WO | WO-2014200061 A1 * 12/2014 | ........... A61B 5/1072 |

* cited by examiner

CONVEYANCE SEAT UNIT

CROSS REFERENCE TO RELATED APPLICATIONS

This application is a National Stage Entry application of PCT Application No. PCT/JP2016/063918, filed May 10, 2016, which claims the priority benefit of Japanese Patent Application No. JP 2015-096624, filed May 11, 2015, the contents being incorporated herein by reference.

BACKGROUND

The present disclosure relates to a conveyance seat unit, and a conveyance seat unit capable of adjusting a state of a portion, in the seat, that affects a load applied to a neck of an occupant when a rear load acts on a conveyance.

A seat equipped in a conveyance (hereinafter referred to as a conveyance seat) is already known. In some seats, a state of a predetermined portion of the seat can be changed. As an example, a conveyance seat described in Japanese Patent Publication JP 2014-139069 A is used as a vehicle seat, and a position of a lumbar support in the seat can be changed according to biological information (e.g., a degree of fatigue) of an occupant.

When a load (e.g., a rear load) acts on a conveyance in which an occupant sits on a seat, a reaction force (a load) from the seat is applied to a neck of an occupant. Changing a state of a predetermined portion of the seat, as described in Japanese Patent Publication JP 2014-139069 A above, is considered as a mechanism to lessen such a load, in particular, changing a state of a portion that affects the above-mentioned load is considered to be effective.

SUMMARY

An effect of reducing a load obtained by changing a state of a predetermined portion of a seat differs according to a body shape, a sex, or the like of an occupant. Thus, when the state of the predetermined portion of the seat is changed to reduce the load, the state needs to be appropriately changed in consideration of the body shape, the sex, or the like of the occupant.

The present disclosure has been implemented in view of the problem described above, and an embodiment of the present disclosure provides a conveyance seat unit configured to appropriately lessen a load applied to a neck of an occupant based on body shape, sex, or the like of the occupant when a rear load acts on a conveyance.

According to an embodiment of the present disclosure, the above problem can be solved by a conveyance seat unit that includes: a conveyance seat configured to support a seated occupant of the conveyance, the conveyance seat being provided with a support portion for supporting the occupant from behind; a state adjustment mechanism configured to adjust a state of a neck load adjustment portion, of the support portion, that affects a neck load applied to a neck of the occupant when a rear load acts on the conveyance; an acquisition portion configured to acquire occupant information on at least one of a body and a sex of the occupant; and a control device configured to control the state adjustment mechanism according to a content of the occupant information acquired by the acquisition portion to change the state of the neck load adjustment portion, which has been adjusted by the state adjustment mechanism, according to the content.

In the conveyance seat unit of the present disclosure configured in an above-mentioned manner, the state adjustment mechanism can adjust the state of the neck load adjustment portion, in the conveyance seat, which affects the load applied to the neck of the occupant, when the rear load acts on the conveyance. In this process, the above-mentioned state can be adjusted according to information on at least one of a body and a sex of the occupant (occupant information). Adjusting the state of the predetermined portion in the seat in consideration of the body shape, the sex, or the like of the occupant in this manner enables the conveyance seat unit to appropriately lessen the load applied to the neck of the occupant when the rear load acts on the conveyance.

Further, in an embodiment of the above-mentioned conveyance seat unit, the neck load adjustment portion is preferably a headrest that supports a head of the occupant from behind. In the above configuration, a state of the headrest as the neck load adjustment portion that affects the load applied to the neck of the occupant can be appropriately adjusted in consideration of the body shape, the sex, or the like of the occupant.

Further, in an embodiment of the above-mentioned conveyance seat unit, the neck load adjustment portion is preferably a rear-moving portion, which is provided in a seat back that supports a back of the occupant and moved backward together with the back of the occupant by being pushed by the back of the occupant. In the above configuration, a state of the rear-moving portion as the neck load adjustment portion that affects the load applied to the neck of the occupant can be appropriately adjusted in consideration of the body shape, the sex, or the like of the occupant.

Further, in an embodiment of the above-mentioned conveyance seat unit, the neck load adjustment portion is preferably an impact energy absorbing portion, which is provided in the seat back that supports the back of the occupant and absorbs impact energy by being deformed when the load acts on the conveyance. In the above configuration, a state of the impact energy absorbing portion as the neck load adjustment portion that affects the load applied to the neck of the occupant can be appropriately adjusted in consideration of the body shape, the sex, or the like of the occupant.

Further, it is preferred that, in an embodiment of the above-mentioned conveyance seat unit, the conveyance seat includes the headrest that supports the head of the occupant from behind and the seat back that supports the back of the occupant, the state adjustment mechanism is configured to adjust at least one of adjusting objects that include a reaching position of the headrest moving forward from a normal position and a deformation amount of the seat back being pushed backward by the back of the occupant when the rear load acts on the conveyance, and the control device controls the state adjustment mechanism according to the content to change at least one of the adjusting objects, which have been adjusted by the state adjustment mechanisms, according to the content. In the above configuration, as a means of lessening the load applied to the neck of the occupant when the rear load acts on the conveyance, at least one of the adjusting objects that include the reaching position of the headrest moving forward from the normal position and the deformation amount of the seat back being pushed backward by the back of the occupant are adjusted. In such a configuration, changing the adjusting objects, which have been adjusted by the state adjustment mechanisms, according to the content of the occupant information enables to appropriately set the adjusting objects after adjustment according to the body shape, the sex, or the like of the occupant.

Further, it is preferred that, in an embodiment of the above-mentioned conveyance seat unit, the acquisition portion includes a pressure sensor configured to detect a pressure applied to the conveyance seat when the occupant sits on the conveyance seat, and acquires information on a body pressure of the occupant based on the pressure detected by the pressure sensor as the occupant information. The above configuration makes it possible to appropriately acquire the occupant information (specifically, the body pressure of the occupant) based on the pressure detected by the pressure sensor.

Further, it is preferred that, in an embodiment of the above-mentioned conveyance seat unit, the acquisition portion includes a camera configured to capture an image of the occupant who sits on the conveyance seat, and acquires information on the sex or the body shape of the occupant based on an image of the occupant captured by the camera as the occupant information. The above configuration makes it possible to appropriately acquire the occupant information (specifically, the sex or the body shape of the occupant) based on the image captured by the camera.

Further, it is preferred that, in an embodiment of the above-mentioned conveyance seat unit, the acquisition portion includes a proximity sensor configured to detect a skeletal shape of the occupant who sits on the conveyance seat, and acquires information on a shape of a predetermined portion of a body of the occupant (for example, information or the like on the skeletal shape of the predetermined portion) based on the skeletal shape detected by the proximity sensor as the occupant information. The above configuration makes it possible to appropriately acquire the occupant information (specifically, information on the shape of the predetermined portion of the body of the occupant) based on the skeletal shape detected by the proximity sensor.

Further, it is preferred that, in an embodiment of the above-mentioned conveyance seat unit, the acquisition portion acquires the occupant information by receiving an indication of an operation performed by the occupant who inputs the occupant information. The above configuration makes it possible to appropriately acquire the occupant information by receiving the indication of the operation performed by the occupant.

Further, it is further preferred that, in an embodiment of the above-mentioned conveyance seat unit, the acquisition portion acquires the occupant information by receiving the indication of the operation performed by the occupant that corresponds to an input button provided inside the conveyance that is pushed by the occupant for the occupant information. The above configuration makes it possible to appropriately acquire the occupant information by receiving the indication of the button operation using the input button.

Further, it is preferred that, in an embodiment of the above-mentioned conveyance seat unit, the headrest is moved along a front to back direction when the rear load acts on the conveyance. In the above configuration, the headrest is moved along the front to back direction when the rear load acts on the conveyance. On the other hand, a position of the headrest after movement can be changed according to the body shape, the sex, or the like of the occupant. This makes it possible to appropriately set the position of the headrest after movement to appropriately lessen the neck load applied to the neck of the occupant according to the body shape, the sex, or the like of the occupant.

Further, it is further preferred that, in an embodiment of the above-mentioned conveyance seat unit, the headrest is moved forward from a normal position when the rear load acts on the conveyance. In the above configuration, the headrest is moved forward when the rear load acts on the conveyance. This makes it possible to appropriately lessen the neck load applied to the neck of the occupant according to the body shape, the sex, or the like of the occupant when the rear load acts on the conveyance.

Further, it is still further preferred that, in an embodiment of the above-mentioned conveyance seat unit, the state adjustment mechanism is configured to adjust a reaching position of the headrest moving forward from the normal position as the state of the headrest, and the control device is configured to change the reaching position, which has been adjusted by the state adjustment mechanism, according to the content. In the above configuration, the reaching position of the headrest moving forward is changed according to the body shape, the sex, or the like of the occupant. In this manner, the load applied to the neck of the occupant can be appropriately lessened by the forward movement of the headrest according to the body shape, the sex, or the like of the occupant when the rear load acts on the conveyance.

Further, it is preferred that, in an embodiment of the above-mentioned conveyance seat unit, the rear-moving portion includes a movable member that is moved backward together with the back of the occupant by being pushed by the back of the occupant when the rear load acts on the conveyance. In the above configuration, the movable member is moved backward together with the back of the occupant by being pushed by the back of the occupant when the rear load acts on the conveyance. On the other hand, a position of the movable member after movement can be changed according to the body shape, the sex, or the like of the occupant. This makes it possible to appropriately set the position of the movable member after movement to appropriately lessen the load applied to the neck of the occupant according to the body shape, the sex, or the like of the occupant.

Further, it is further preferred that, in an embodiment of the above-mentioned conveyance seat unit, the state adjustment mechanism is configured to adjust a reaching position of the movable member moving backward as the state of the movable member, and the control device changes the reaching position, which has been adjusted by the state adjustment mechanism, according to the content. In the above configuration, the reaching position of the movable member moving backward is changed according to the body shape, the sex, or the like of the occupant. In this manner, the load applied to the neck of the occupant can be appropriately lessened by the backward movement of the movable member according to the body shape, the sex, or the like of the occupant when the rear load acts on the conveyance.

Further, it is preferred that, in an embodiment of the above-mentioned conveyance seat unit, the movable member is moved backward together with the back of the occupant while being deflected by being pushed by the back of the occupant when the rear load acts on the conveyance, the state adjustment mechanism is configured to adjust a deflection amount of the movable member per unit load as the state of the movable member, and the control device changes the deflection amount, which has been adjusted by the state adjustment mechanism, according to the content. In the above configuration, the deflection amount of the movable member per unit load is changed according to the body shape, the sex, or the like of the occupant. In this manner, the load applied to the neck of the occupant can be appropriately lessened by the deflection (the backward movement) of the movable member according to the body shape, the sex, or the like of the occupant when the rear load acts on the conveyance.

Further, it is preferred that, in an embodiment of the above-mentioned conveyance seat unit, the impact energy absorbing portion is a fragile portion formed in a seat back frame located inside the seat back and deformed to provide a bending starting point of the seat back frame when the rear load acts on the conveyance. In the above configuration, the fragile portion formed in the seat back frame is deformed and the seat back frame is bent backward when the rear load acts on the conveyance. On the other hand, a deformation amount of the fragile portion can be changed according to the body shape, the sex, or the like of the occupant. This makes it possible to appropriately set the state of the fragile portion after deformation to appropriately lessen the load applied to the neck of the occupant according to the body shape, the sex, or the like of the occupant.

Further, it is preferred that, in an embodiment of the above-mentioned conveyance seat unit, the state adjustment mechanism is configured to adjust a limit deformation amount of the fragile portion being deformed as the state of the fragile portion, and the control device changes the limit deformation amount, which has been adjusted by the state adjustment mechanism, according to the content. In the above configuration, the limit deformation amount of the fragile portion being deformed is changed according to the body shape, the sex, or the like of the occupant. In this manner, the load applied to the neck of the occupant can be appropriately lessened by the deformation of the fragile portion according to the body shape, the sex, or the like of the occupant when the rear load acts on the conveyance.

According to an embodiment of the present disclosure, it becomes possible to appropriately lessen the load applied to the neck of the occupant in consideration of the body shape, the sex, or the like of the occupant when the rear load acts on the conveyance. Further, according to an embodiment of the present disclosure, it becomes possible to appropriately adjust the state of the headrest as the portion that affects the load applied to the neck of the occupant in consideration of the body shape, the sex, or the like of the occupant. Further, according to an embodiment of the present disclosure, it becomes possible to appropriately adjust the state of the rear-moving portion as the portion that affects the load applied to the neck of the occupant in consideration of the body shape, the sex, or the like of the occupant. Further, according to an embodiment of the present disclosure, it becomes possible to appropriately adjust the state of the impact energy absorbing portion as the portion that affects the load applied to the neck of the occupant in consideration of the body shape, the sex, or the like of the occupant. Further, according to an embodiment of the present disclosure, in regard to the adjusting objects that are adjusted to lessen the load applied to the neck of the occupant when the rear load acts on the conveyance, the adjusting objects after adjustment are appropriately set according to the body shape, the sex, or the like of the occupant. Further, according to an embodiment of the present disclosure, it becomes possible to appropriately acquire the occupant information (specifically, the body pressure of the occupant) based on the pressure detected by the pressure sensor. Further, according to an embodiment of the present disclosure, it becomes possible to appropriately acquire the occupant information (specifically, the sex or the body shape of the occupant) based on the image captured by the camera. Further, according to an embodiment of the present disclosure, it becomes possible to appropriately acquire the occupant information (specifically, information on the shape of the predetermined portion of the body of the occupant) based on the skeletal shape detected by the proximity sensor. Further, according to an embodiment of the present disclosure, it becomes possible to appropriately acquire the occupant information by receiving the operation performed by the occupant. Further, according to an embodiment of the present disclosure, it becomes possible to appropriately acquire the occupant information by receiving the button operation using the input button. Further, according to an embodiment of the present disclosure, it becomes possible to appropriately set the position of the headrest after movement to appropriately lessen the load applied to the neck of the occupant according to the body shape, the sex, or the like of the occupant. Further, according to an embodiment of the present disclosure, it becomes possible to appropriately exert the effect of lessening the load applied to the neck of the occupant by the forward movement of the headrest according to the body shape, the sex, or the like of the occupant. Further, according to an embodiment of the present disclosure, it becomes possible to appropriately set the reaching position of the headrest moving forward according to the body shape, the sex, or the like of the occupant. Further, according to an embodiment of the present disclosure, it becomes possible to appropriately set the position of the movable member after movement to appropriately lessen the load applied to the neck of the occupant according to the body shape, the sex, or the like of the occupant. Further, according to an embodiment of the present disclosure, it becomes possible to appropriately exert the effect of lessening the load applied to the neck of the occupant by the backward movement of the movable member according to the body shape, the sex, or the like of the occupant. Alternatively, according to an embodiment of the present disclosure, it becomes possible to appropriately exert the effect of lessening the load applied to the neck of the occupant by the deflection of the movable member according to the body shape, the sex, or the like of the occupant. Further, according to an embodiment of the present disclosure, it becomes possible to appropriately set the state of the fragile portion after deformation to appropriately lessen the load applied to the neck of the occupant according to the body shape, the sex, or the like of the occupant. Further, according to an embodiment of the present disclosure, it becomes possible to appropriately exert the effect of lessening the load applied to the neck of the occupant by the deformation of the fragile portion according to the body shape, the sex, or the like of the occupant.

BRIEF DESCRIPTION OF DRAWINGS

Various embodiments of the invention are illustrated in the drawings, in which.

DETAILED DESCRIPTION

Hereinafter, one embodiment (the present embodiment) of the present disclosure is described in detail. Note that a vehicle seat unit equipped in a vehicle (e.g., an automobile) is used below as an example to describe a conveyance seat unit. However, the conveyance seat unit of the present disclosure may be equipped in conveyances other than the vehicle, such as, for example, an airplane and a ship.

Further, in the following description, a "front to back direction" indicates a front to back direction of the vehicle seat, and specifically it is a direction corresponding to a travel direction of the vehicle. Further, a "width direction" signifies a width direction (a right and left direction) of the vehicle seat, and it is a direction corresponding to a width direction of a seat back included in the vehicle seat.

Figure 1:
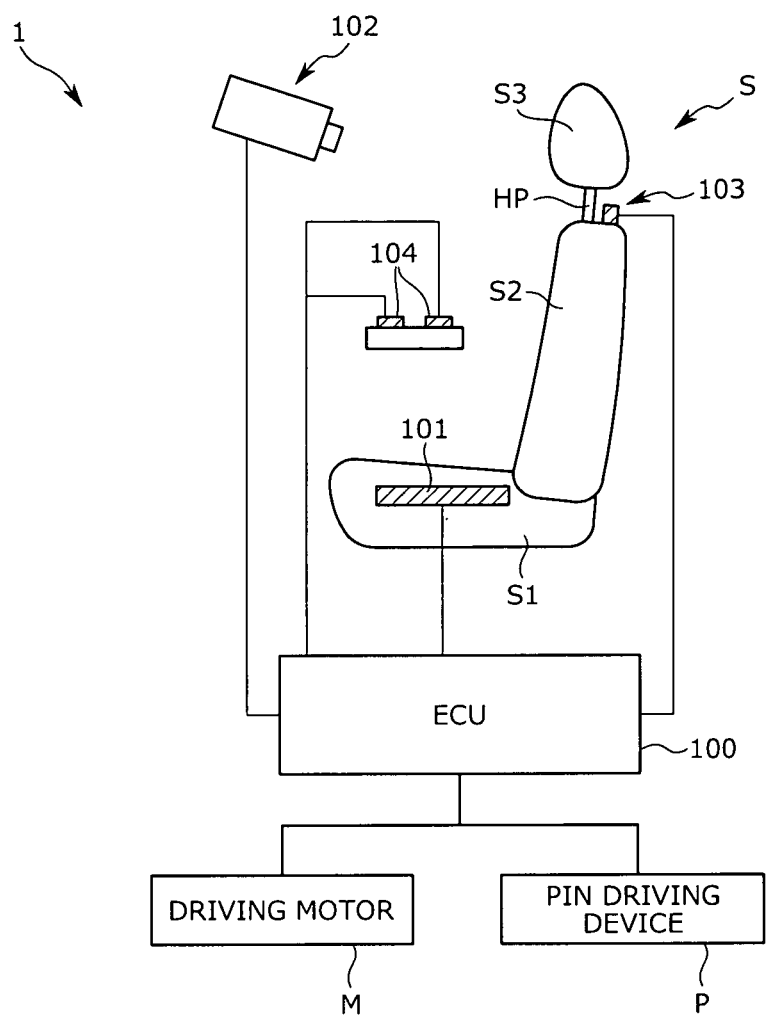
FIG. 1 is a diagram illustrating a configuration of a conveyance seat unit according to one embodiment of the present disclosure.

An overall configuration of a vehicle seat unit (hereinafter referred to as a seat unit 1) according to the present embodiment is described with reference to FIG. 1. As shown in FIG. 1, the seat unit 1 is configured from a vehicle seat S as the conveyance seat and its peripheral devices. The peripheral devices include an Electric Control Unit (ECU) 100 equipped in a vehicle. The ECU 100 is configured to acquire information about an occupant who sits on the vehicle seat S, that is, occupant information, and is configured to adjust a state of a predetermined portion of the vehicle seat S based on the occupant information. Specifically, the vehicle seat S is internally equipped with a driving mechanism for driving the predetermined portion. Then, the ECU 100 controls the driving mechanism according to a content of the occupant information to adjust the state of the predetermined portion in the vehicle seat S.

The vehicle seat S is a seat on which the vehicle occupant sits (e.g., the seat is configured to support a seated occupant), and includes, like a common vehicle seat, a seat cushion S1 for supporting buttocks of the occupant, a seat back S2 for supporting a back of the occupant, and a headrest S3 for supporting a head of the occupant. In this configuration, the seat back S2 and the headrest S3 correspond to support portions which support the occupant from behind. The seat back S2 includes a seat back frame F shown in FIG. 2 in its inside. The seat back frame F constitutes a framework of the seat back S2 and includes a pair of side frames 11 arranged in a width direction, an upper frame 12 which couples upper end portions of the side frames 11, and a lower member frame 13 which couples lower end portions of the side frames 11.

Further, the vehicle seat S according to the present embodiment incorporates one or more of a plurality of mechanisms (hereinafter referred to as neck load lessening mechanisms) for lessening the load applied to the neck of the occupant when the rear load acts on the vehicle in an event of the rear-end collision of the vehicle or the like. Each neck load lessening mechanism incorporated by the vehicle seat S according to the present embodiment is described below.

First Neck Load Lessening Mechanism

A first neck load lessening mechanism is a pressure receiving plate 14 provided to the seat back frame F. The pressure receiving plate 14 is configured as a movable member arranged between the side frames 11 in the width direction, more specifically, a plate body made of a resin. Further, the pressure receiving plate 14 corresponds to a rear-moving portion that is moved backward together with the back of the occupant by being pushed by the back of the occupant when the rear load acts on the vehicle.

Figure 2:
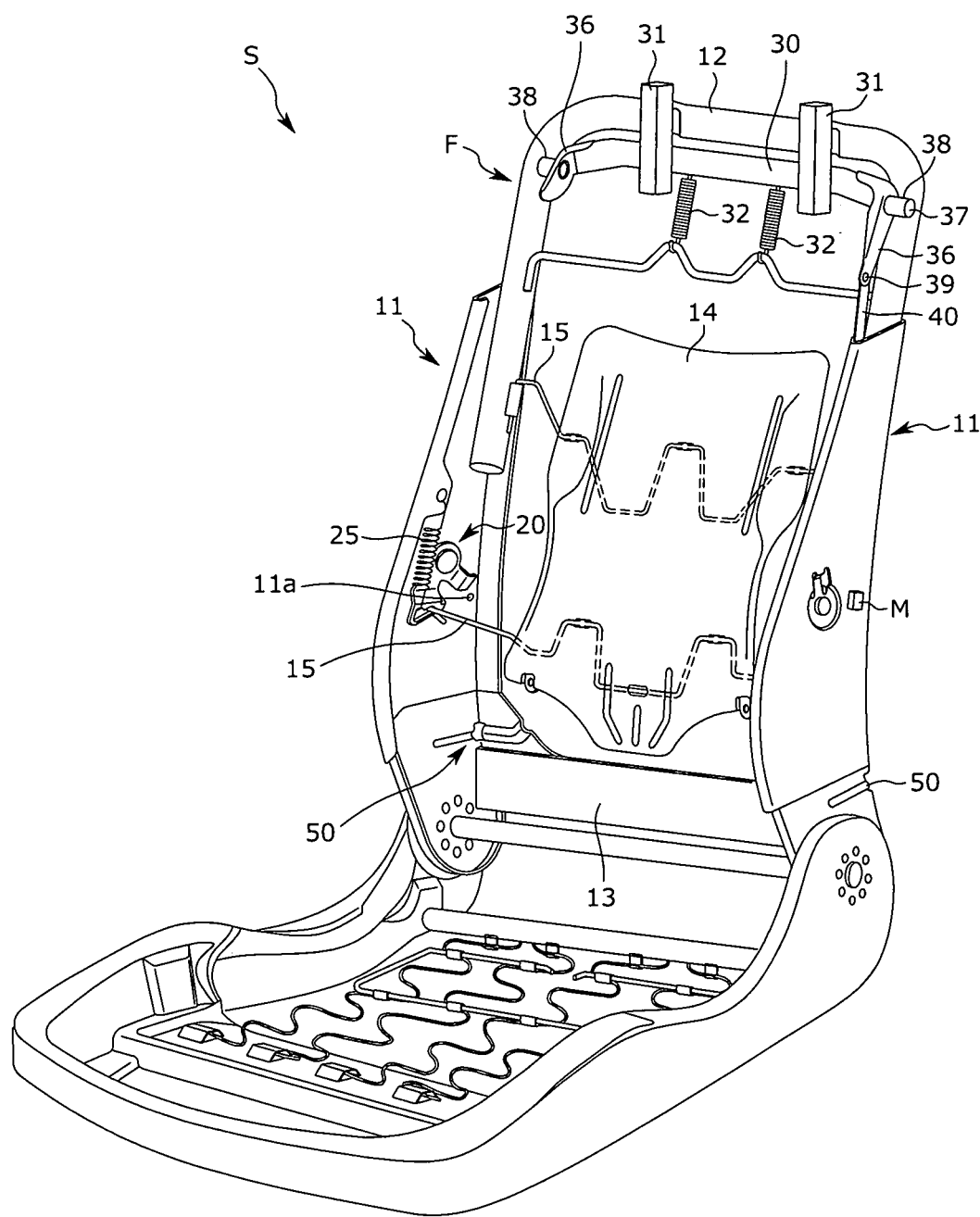
FIG. 2 is a perspective view illustrating a seat frame according to one embodiment of the present disclosure.

The pressure receiving plate 14 and its surrounding structures is now described in detail. The pressure receiving plate 14, which is formed in a substantially rectangular shape as viewed in front elevation, includes a cushion pad (not illustrated) at its front surface. Then, the pressure receiving plate 14 supports the back of the occupant from behind via the cushion pad, while being subjected to a pressing force from the back of the occupant. Further, as shown in FIG. 2, the pressure receiving plate 14 is engaged with two wires 15 at its rear surface. The two wires 15 are laid between the pair of the side frames 11. The pressure receiving plate 14 is then supported by the two wires 15 and locking portions (not illustrated), arranged on the rear surface of the pressure receiving plate 14, are hooked on the wires 15.

One of the two wires 15 located below is hooked on rotating members 20 mounted to the side frames 11. The rotating members 20 are rotatably attached to inner surfaces of the side frames 11. Then, when the pressing force of the pressure receiving plate 14 being pushed backward by the back of the occupant, which results when the rear load acts on the vehicle, becomes a predetermined value or higher, the rotating members 20 are rotated backward by the above-mentioned pressing force transmitted via the wire 15.

Figure 3:
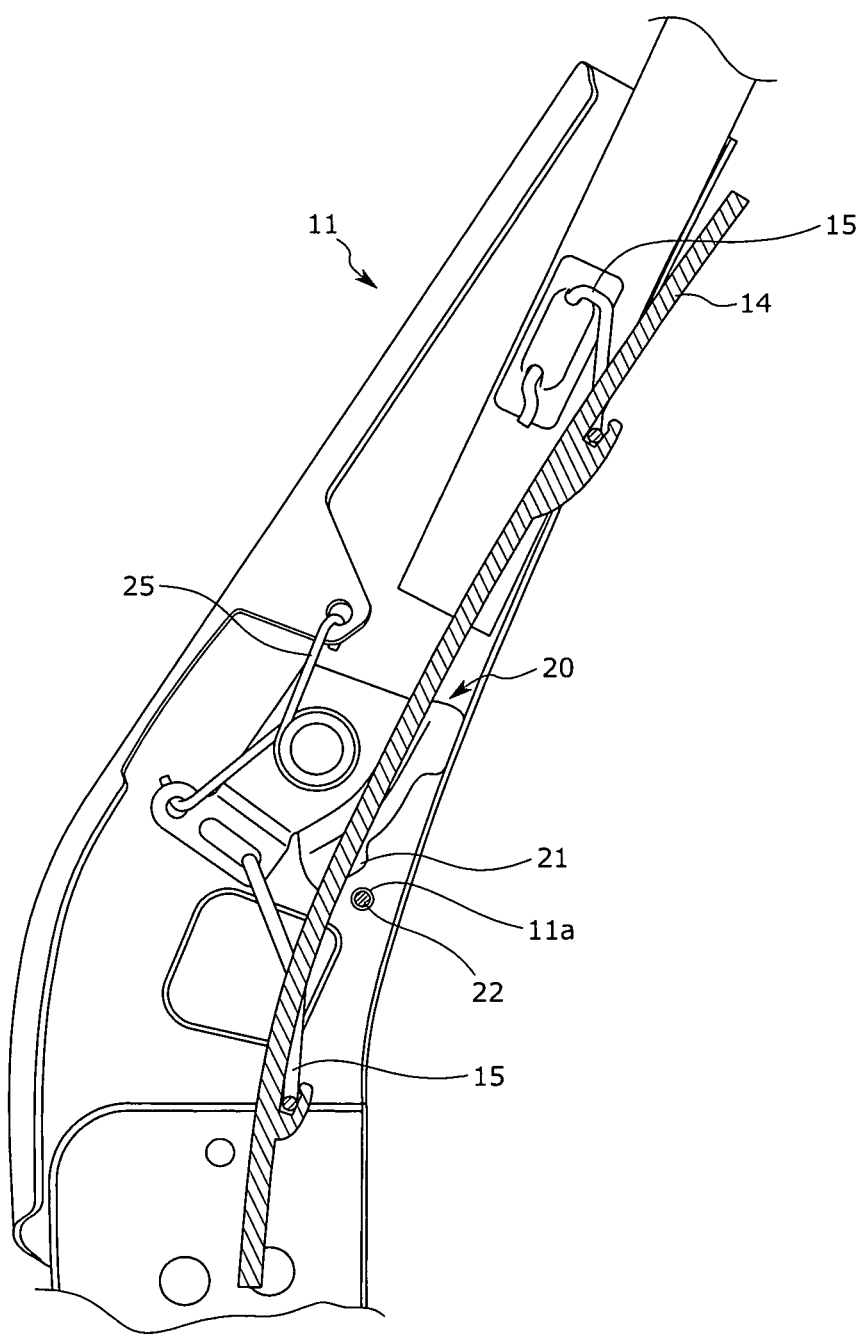
FIG. 3 is a side cross-sectional view illustrating a seat back frame before a rear-moving portion is moved backward.

More specifically, each rotating member 20 is hooked on one end portion of a torsion spring 25. The torsion spring 25 is a member that keeps the rotating member 20 at a predetermined position. That is, the rotating member 20 is kept at the predetermined position at a normal time by a biasing force applied by the torsion spring 25. This causes the wire 15 engaged to the rotating members 20 and the pressure receiving plate 14 retained by the wire 15 to continuously stay at positions shown in FIG. 3 (hereinafter referred to as normal positions) at the normal time.

Figure 4:
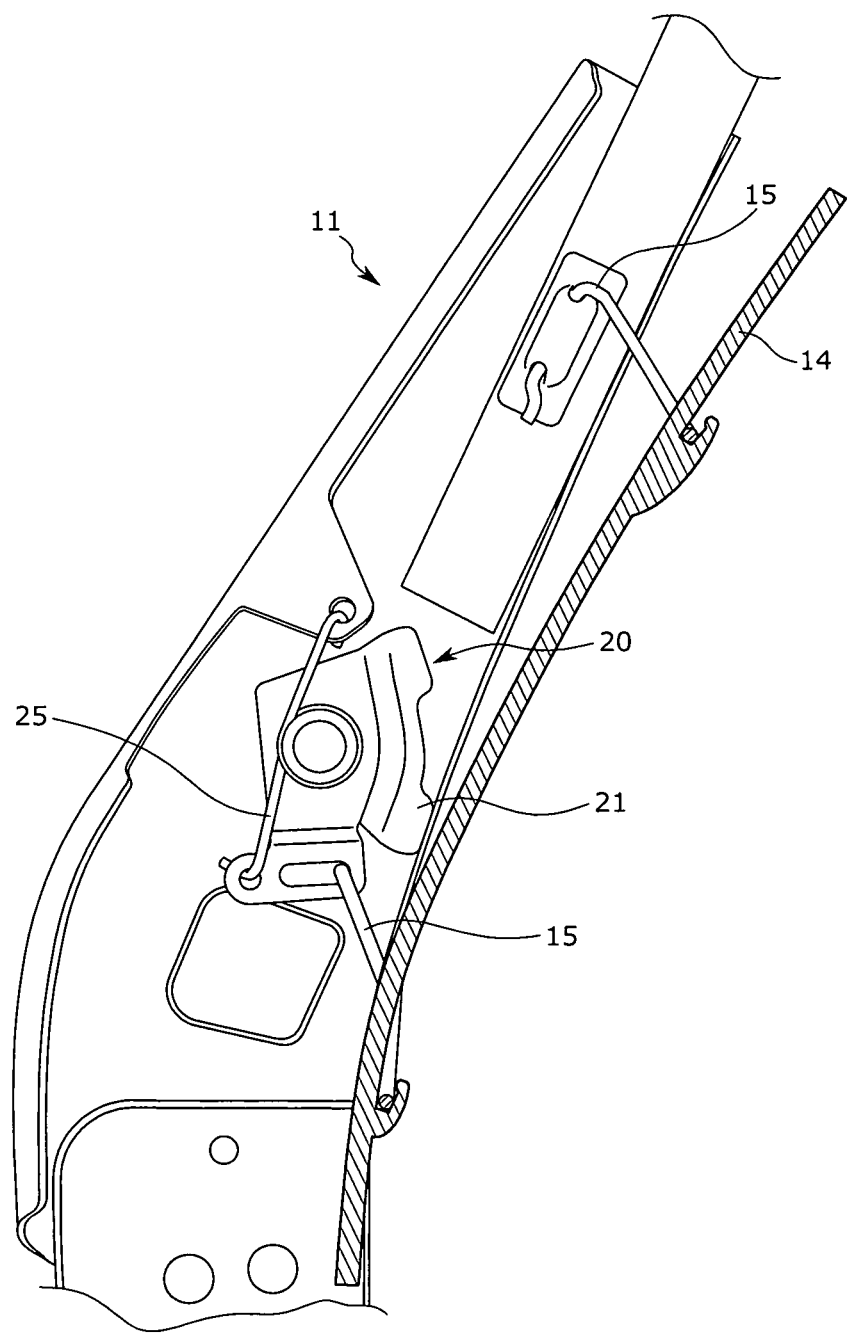
FIG. 4 is a side cross-sectional view illustrating the seat back frame after the rear-moving portion is moved backward.

On the other hand, when the pressing force of the pressure receiving plate 14 being pushed backward by the back of the occupant becomes the predetermined value or higher, the rotating member 20 is rotated backward against the biasing force of the torsion springs 25. Consequently, the wire 15 engaged to the rotating member 20 and the pressure receiving plate 14 retained by the wire 15 are moved backward. That is, as shown in FIG. 4, the pressure receiving plate 14 is moved from the normal position to a rear position.

When the pressure receiving plate 14 is moved backward as described above, the back of the occupant is moved backward together with the pressure receiving plate 14. That is, the back of the occupant sinks in the seat back S2 as the pressure receiving plate 14 moves backward, resulting in a reduction of the load applied to the neck of the occupant. In this regard, it is apparent that the pressure receiving plate 14 is a neck load adjustment portion that affects the load applied to the neck of the occupant in the seat back S2 when the rear load acts on the conveyance.

Note that the rotating member 20 eventually abuts a rotation inhibiting portion when rotating backward. This prevents the rotating member 20 from further rotating backward and the pressure receiving plate 14 stops at a position where the rotating member 20 abuts the rotation inhibiting portion. That is, the position of the pressure receiving plate 14 at a time when the rotating member 20 abuts the rotation inhibiting portion corresponds to a reaching position of the pressure receiving plate 14 moving backward.

Further, in the present embodiment, the above-mentioned rotation inhibiting portions are located at a plurality of points (specifically, two points) on mutually different positions in the front to back direction. Specifically, one of the rotation inhibiting portions is formed on a rear wall of the side frame 11. For example, as shown in FIG. 4, such a rotation inhibiting portion is configured as a portion of the rear wall on which a rear end tongue-shaped portion 21 of the rotating member 20 abuts.

Figure 5:
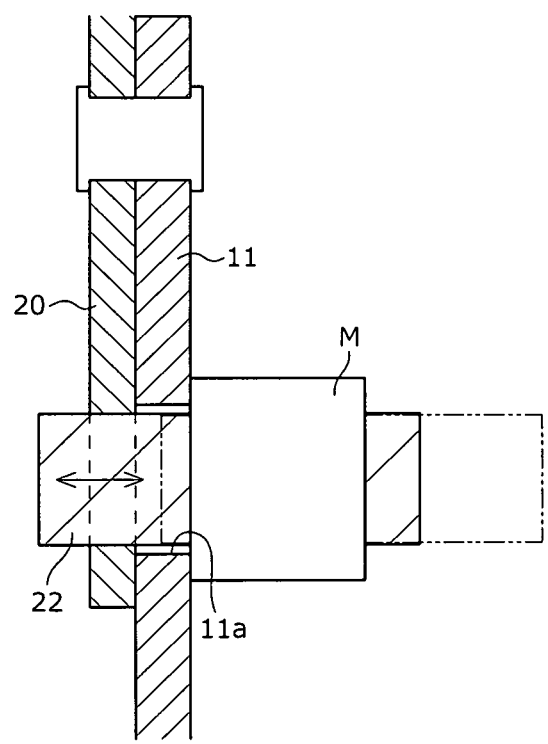
FIG. 5 is an enlarged schematic cross-sectional view illustrating surroundings of a movable pin in the seat back frame.

The other rotation inhibiting portion is located at the front side of the rear wall of the side frame 11 and configured as a movable pin 22, which can freely advance and retreat in the width direction. The movable pin 22 is driven by a driving motor M shown in FIG. 5 and advances and retreats in the width direction along a through hole 11a formed on a side wall of the side frame 11. Specifically, the movable pin 22 moves between a position in which a tip portion of the movable pin 22 projects from an opening of the through hole 11a toward an inner side in the width direction (hereinafter, referred to as a protrusion position) and a position in which the tip portion is positioned at an outer side in the width direction relative to the opening of the through hole 11a (hereinafter, referred to as a standby position).

Then, when the movable pin 22 is at the standby position, the rotating member 20 is configured to abut the rotation inhibiting portion formed on the rear wall of the side frame 11. In this case, the reaching position of the pressure receiving plate 14 moving backward is positioned more backward. On the other hand, when the movable pin 22 is at the protrusion position, the rotating member 20 is configured to abut the movable pin 22 in front of the rear wall of the side frame 11. In this case, the reaching position of the pressure receiving plate 14 moving backward is positioned more forward.

In the present embodiment described above, the reaching positions of the pressure receiving plate 14 moving backward are set at a plurality of points (specifically, two points) on mutually different positions in the front to back direction and switchable by the advancing and retreating operation of the movable pin 22. In this regard, it is apparent that the movable pin 22 and the driving motor M driving the movable pin 22 correspond to a state adjustment mechanism which is configured to adjust the state of the pressure receiving plate 14 in the event of the rear-end collision of the vehicle. For example, the movable pin 22 and the driving motor M adjust the reaching position of the pressure receiving plate 14 moving backward as the state of the pressure receiving plate 14. That is, the reaching position of the pressure receiving plate 14 moving backward is adjusted as an adjusting object in the event of the rear-end collision of the vehicle. The reaching position of the pressure receiving plate 14 moving backward described herein is equivalent to a deformation amount of the seat back S2 being pushed backward by the back of the occupant (in other words, an intrusion amount of the back of the occupant intruded into the seat back S2).

Second Neck Load Lessening Mechanism

A second neck load lessening mechanism is the headrest S3, described above. More specifically, the headrest S3 according to the present embodiment is movable along the front to back direction when the rear load acts on the vehicle. In particular, the headrest S3 is moved forward from a normal position when the rear load acts on the conveyance.

The headrest S3 and its surrounding configurations according to the present embodiment are described below. The headrest S3 is held by a seat back frame F using headrest pillars HP that are extended downward from the headrest S3 and inserted into pillar guides 31 provided on an upper portion of the seat back frame F.

On the other hand, the pillar guides 31 are attached to a pillar guide installation frame 30 arranged near the upper frame 12. The pillar guide installation frame 30 is aligned parallel to the upper frame 12 in a vertical direction and extended along the width direction.

Further, link brackets 36 formed approximately in an L-shape in a cross section are fixed at both ends of the pillar guide installation frame 30 by welding or the like. Each link bracket 36 is connected to a rotation support member 38 welded to the upper frame 12 (for example, in the vicinity of a connection portion to the side frame 11) via a shaft 37. That is, the pillar guide installation frame 30 is attached to the seat back frame F in a manner rotatable around the shaft 37. This allows the headrest S3 held by the pillar guide installation frame 30 via the headrest pillars HP to move in the front to back direction while rotating around the shaft 37.

Figure 6:
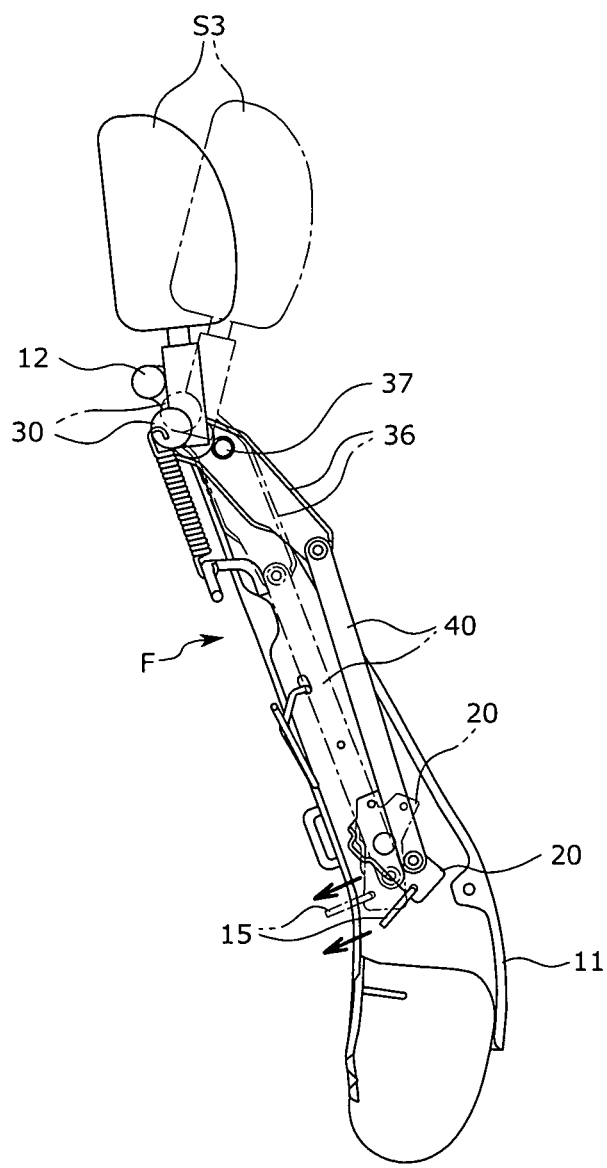
FIG. 6 is an explanatory diagram illustrating a mechanism by which a headrest is moved in a front to back direction.

Note that respective end portions of coil springs 32 are hooked on the pillar guide installation frame 30. The coil springs 32 are members which keep the pillar guide installation frame 30 at a predetermined position. That is, the pillar guide installation frame 30 stays at the predetermined position by a biasing force applied from the coil springs 32 at the normal time. This allows the headrest S3 held by the pillar guide installation frame 30 to continuously stay in a position shown by solid lines in FIG. 6 (hereinafter referred to as a normal position) at the normal time.

Further, the link bracket 36 arranged on one end side in the width direction (a left side in FIG. 2) has a lower end (an end on an opposite side to the end connecting to the pillar guide installation frame 30) as a free end. On the other hand, the link bracket 36 arranged on the other end side in the width direction (a right side in FIG. 2) is connected to a connection link 40 at its lower end portion via a shaft 39. The connection link 40 is interposed between the lower end portion of the link bracket 36 on the other end side in the width direction and the predetermined position of the rotating member 20 described above.

As described above, the connection link 40 connects the link bracket 36 on the other end side in the width direction and the rotating member 20, thus a rotation operation of the rotating member 20 is transmitted to the pillar guide installation frame 30 via the link bracket 36. As a result, the headrest S3 held by the pillar guide installation frame 30 is moved forward and backward. In particular, when the rear load acts on the vehicle and the rotating member 20 is rotated backward, the pillar guide installation frame 30 is rotated forward in conjunction with the rotation of the rotating member 20. Then, the forward rotation of the pillar guide installation frame 30 causes the headrest S3 to move from the normal position to a forward position (a position shown by dashed lines in FIG. 6).

The configuration described above allows the headrest S3 to move forward to support the head of the occupant in the event of the rear-end collision of the vehicle. As a result, the load applied to the neck of the occupant is lessened. In this regard, it is apparent that the headrest S3 is a neck load adjustment portion that affects the load applied to the neck of the occupant in the support portion that supports the back of the occupant in the vehicle seat S when the rear load acts on the conveyance.

Note that, as described above, the rotating member 20 eventually abuts the rotation inhibiting portion when rotating backward. At this point, further backward rotation of the rotating member 20 is prevented. On the other hand, when the backward rotation of the rotating member 20 is prevented, the forward movement of the headrest S3 is stopped. That is, a position of the headrest S3 at a time when the rotating member 20 abuts the rotation inhibiting portion corresponds to the reaching position of the headrest S3 moving forward.

Further, as described above, there are a plurality of abutting points (specifically, two points) between the rotating member 20 and the rotation inhibiting portion on mutually different positions in the front to back direction. Specifically, the abutting points are at a position where the rotating member 20 abuts the movable pin 22 and a position where the rotating member 20 abuts the rear wall of the side frame 11. Then, when the rotating member 20 abuts the rear wall of the side frame 11, the reaching position of the headrest S3 moving forward is positioned more forward. On the other hand, when the rotating member 20 abuts the movable pin 22 in front of the rear wall of the side frame 11, the reaching position of the headrest S3 moving forward is positioned more backward.

In the present embodiment described above, the reaching positions of the headrest S3 moving forward are set at a plurality of points (specifically, two points) on mutually different positions in the front to back direction. Further, the reaching positions of the headrest S3 moving forward are switchable by a change in the abutting positions between the rotating member 20 and the rotation inhibiting portion, specifically, the advancing and retreating operation of the movable pin 22. In this regard, it is apparent that the movable pin 22 and the driving motor M driving the movable pin 22 correspond to the state adjustment mechanism which is configured to adjust the state of the headrest S3 in the event of the rear-end collision of the vehicle. For example, the movable pin 22 and the driving motor M adjust the reaching positions of the headrest S3 moving forward as the state of the headrest S3. That is, the reaching positions of the headrest S3 moving forward are adjusted as the adjusting object in the event of the rear-end collision of the vehicle.

Note that, in the present embodiment, the state of the pressure receiving plate 14 and the state of the headrest S3 are adjusted by a common mechanism. Specifically, the common mechanism is configured as the movable pin 22 and the driving motor M. However, the present embodiment is not limited thereto, and a mechanism that adjusts the state of the pressure receiving plate 14 and a mechanism that adjusts the state of the headrest S3 may be separately provided. That is, the mechanism that adjusts the reaching positions of the headrest S3 moving forward may be different from the one that adjusts the state of the pressure receiving plate 14, and each mechanism may be provided exclusively for the corresponding neck load lessening mechanism.

Third Neck Load Lessening Mechanism

Figure 7:
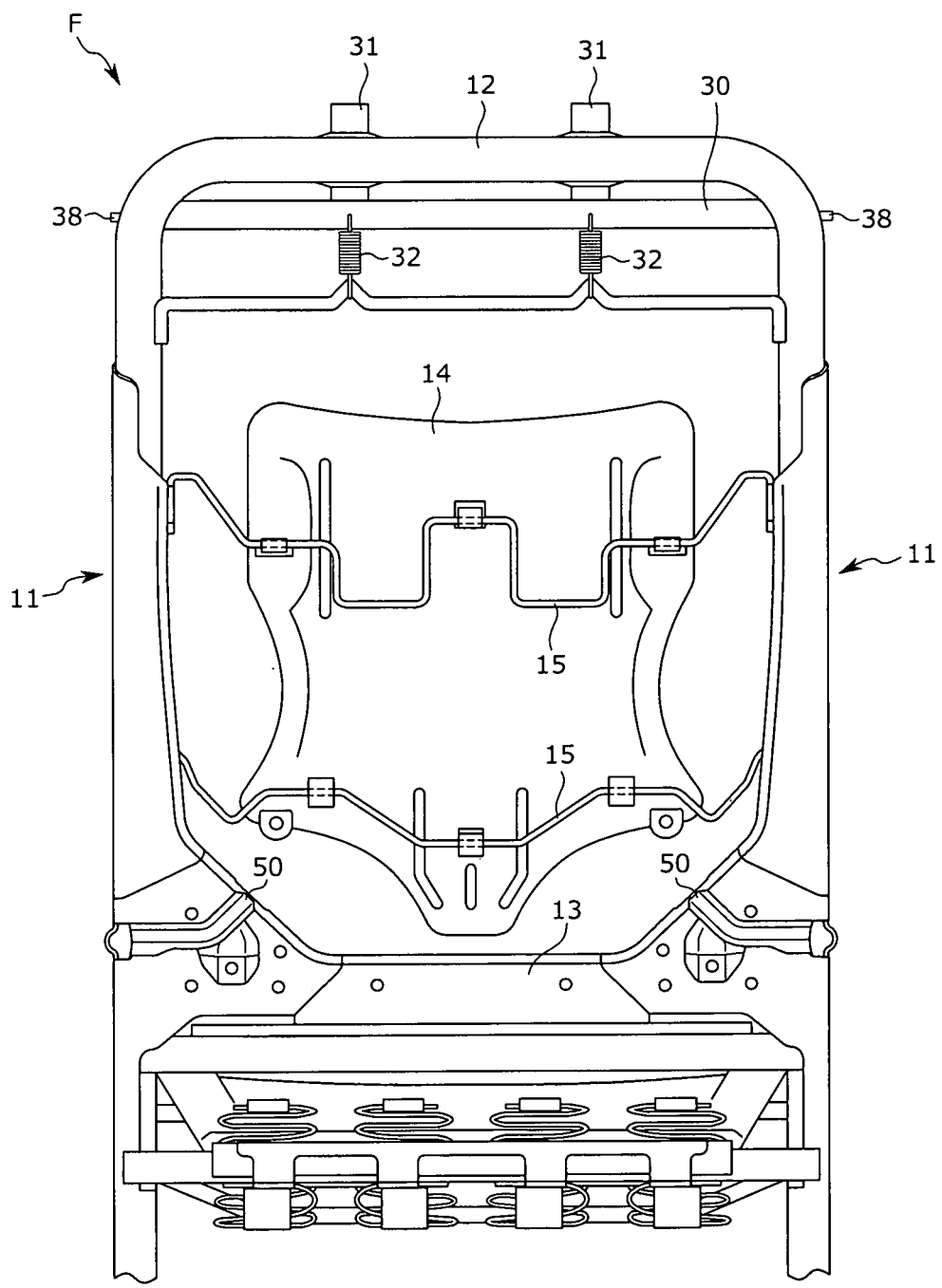
FIG. 7 is a rear view illustrating the seat back frame according to one embodiment of the present disclosure.

A third neck load lessening mechanism includes fragile portions 50 arranged on the seat back frame F. As shown in FIG. 7, each fragile portion 50 is configured as a concave portion (e.g., a recess) formed on a lower end portion of the rear wall of the side frame 11. Note that the fragile portion 50 only needs to be fragile to be selectively deformed when a predetermined or larger load is applied, and it may be configured as a hole portion instead of the concave portion. Further, the fragile portion 50 corresponds to an impact energy absorbing portion that absorbs impact energy by being selectively deformed (specifically, by being squeezed) when the rear load acts on the vehicle.

Figure 8:
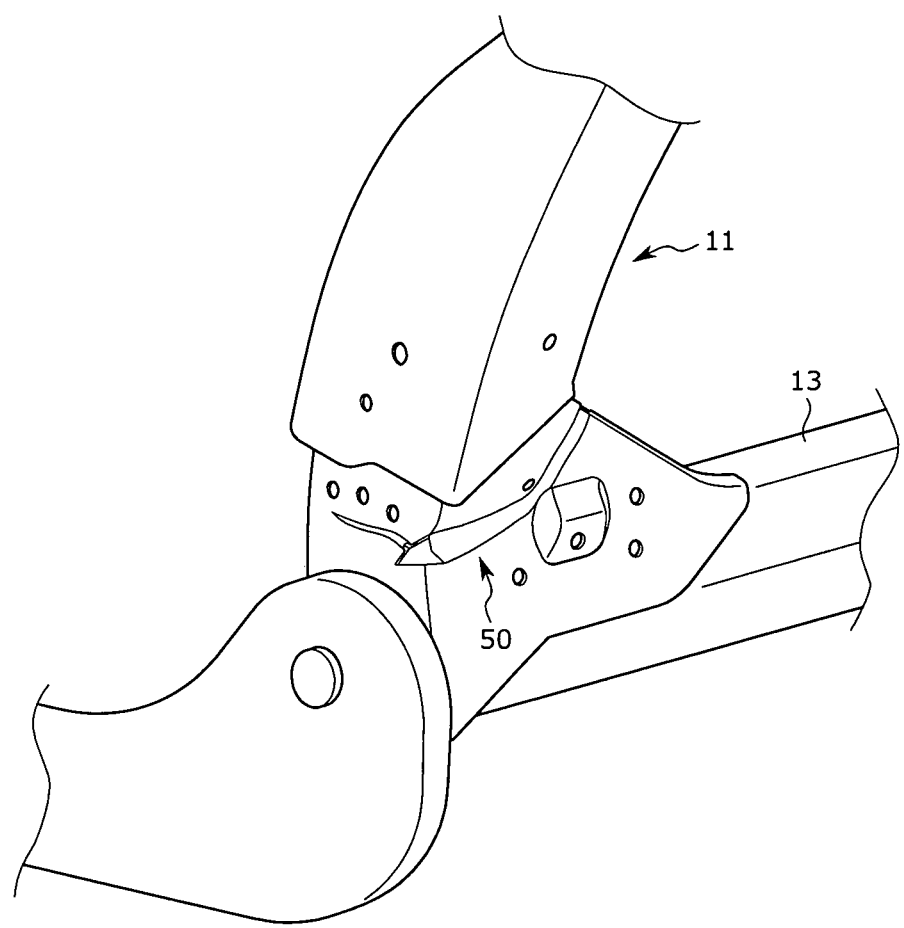
FIG. 8 is a diagram illustrating a state in which a fragile portion is deformed.

More specifically, when the rear load acts on the vehicle, the occupant is quickly moved backward. In this process, as shown in FIG. 8, the fragile portion 50 is squeezed in a vertical direction and then the side frame 11 is bent to a rear side with the fragile portion 50 as its starting point. In this manner, the deformation of the fragile portion 50 causes bending deformation of the side frame 11 in the seat back frame F with the fragile portion 50 as the bending starting point to absorb the impact energy in the event of the rear-end collision of the vehicle. In this regard, it is apparent that the fragile portion 50 is a neck load adjustment portion that affects the load applied to the neck of the occupant in the seat back S2 when the rear load acts on the conveyance.

Note that when a bending angle of the side frame 11 reaches a predetermined angle, a part of the rear wall of the side frame 11 located above the fragile portion 50 abuts a fall inhibiting portion. This prevents further deformation of the fragile portion 50, in other words, further bending of the side frame 11. That is, the deformation amount of the fragile portion 50 at a time when the side frame 11 abuts the fall inhibiting portion corresponds to a limit deformation amount of the fragile portion 50.

Figure 9:
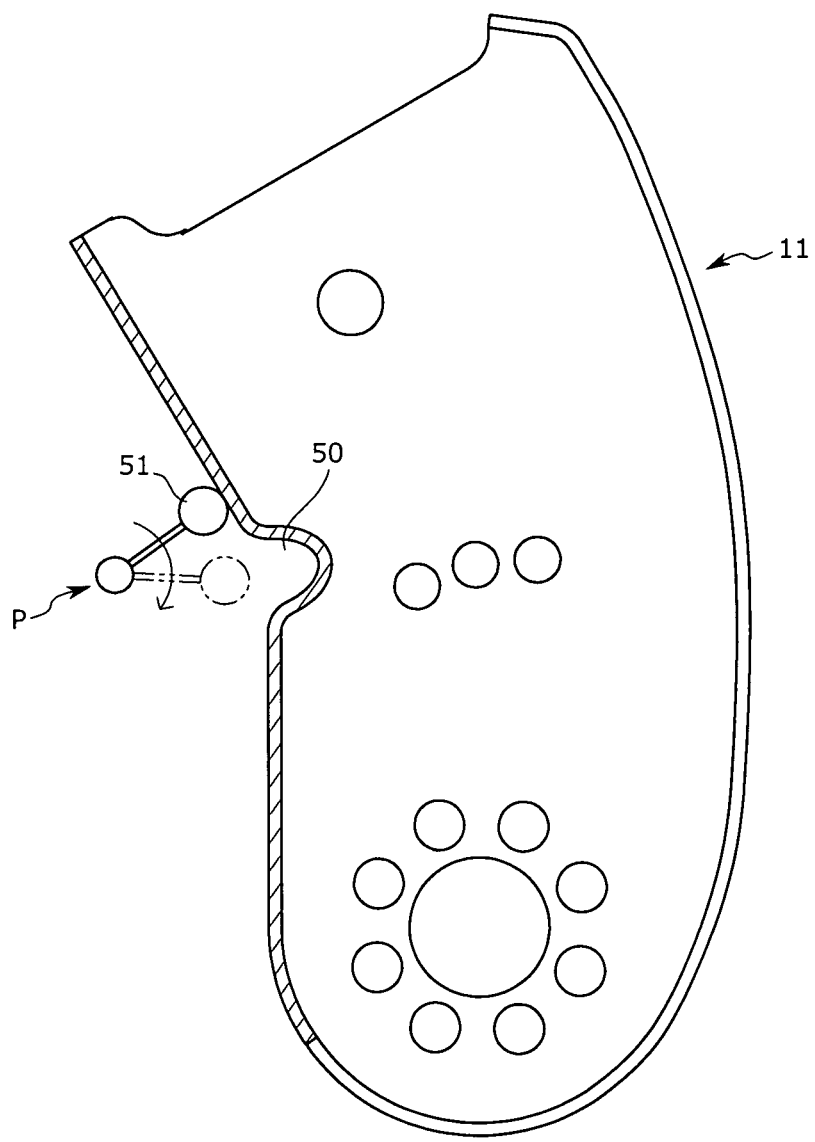
FIG. 9 is an enlarged schematic view illustrating the fragile portion and its surroundings in the seat back frame.

Further, in the present embodiment, the above-mentioned fall inhibiting portion is configured as a movable pin 51 shown in FIG. 9. The movable pin 51 is driven by a pin driving device P shown in FIG. 9 and can be moved in the front to back direction and the vertical direction. Specifically, the movable pin 51 is moved between an initial position shown by broken lines in FIG. 9 and a change position shown by solid lines in FIG. 9 by a function of the pin driving device P. Note that the change position is located further backward and upward than the initial position.

Then, when the movable pin 51 is at the initial position, the limit deformation amount of the fragile portion 50 is in a level corresponding to the initial position, and the side frame 11 bends to a predetermined bending angle. On the other hand, when the movable pin 51 is at the change position, the limit deformation amount of the fragile portion 50 is smaller than that when the movable pin 51 is at the initial position, and the bending angle of the side frame 11 when bending is restricted to be smaller.

In the present embodiment described above, a plurality of kinds (specifically, two kinds) of the limit deformation amounts are set for the fragile portion 50 being deformed, and they are switchable by a moving operation of the movable pin 51. In this regard, it is apparent that the movable pin 51 and the pin driving device P driving the movable pin 51 correspond to the state adjustment mechanism which is configured to adjust the state of the fragile portion 50 in the event of the rear-end collision of the vehicle. For example, the movable pin 51 and the pin driving device P adjust the limit deformation amount of the fragile portion 50 being deformed as the state of the fragile portion 50. That is, the limit deformation amount of the fragile portion 50 being deformed is adjusted as the adjusting object in the event of the rear-end collision of the vehicle.

Note that the states of the above-mentioned neck load lessening mechanisms (specifically, the headrest S3, the pressure receiving plate 14, and the fragile portion 50) in the event of the rear-end collision of the vehicle can be changed through a control of the ECU 100. More specifically, the ECU 100 controls the driving mechanisms (specifically, the driving motor M and the pin driving device P) that adjust the states of the neck load lessening mechanisms. That is, in the present embodiment, the ECU 100 functions as a control device. Then, the driving mechanisms controlled by the ECU 100 change the states of the neck load lessening mechanisms that have been adjusted by the driving mechanisms.

Further, in the present embodiment, when controlling the above-mentioned driving mechanisms, the ECU 100 receives signals of various sensors installed in the vehicle seat S and an image signal of a camera 102 installed in front of the vehicle seat S. The ECU 100 then analyzes these signals to acquire the occupant information on the body of the occupant and the occupant information on the sex of the occupant. That is, the ECU 100 forms an acquisition portion together with the various sensors and the camera 102, and acquires the occupant information cooperatively with them. Hereinafter, acquisition procedures of the occupant information are described.

In the present embodiment, a pressure sensor 101 shown in FIG. 1 is provided on a seating face of the seat cushion S1 of the vehicle seat S. The pressure sensor 101, which is configured as a known pressure sensor, detects a pressure applied to the vehicle seat S (for example, the seating face) when the occupant sits on the vehicle seat S, and outputs a signal indicating its detection result. Upon receiving the output signal from the pressure sensor 101, the ECU 100 identifies the pressure detected by the pressure sensor 101 and acquires information on a body pressure (a seating pressure) of the occupant based on the identified pressure, as the occupant information.

Further, in the present embodiment, the camera 102 shown in FIG. 1 is installed in front of the vehicle seat S. The camera 102, which is configured as a known video camera, captures an image of a face of the occupant who sits on the vehicle seat S, and outputs a signal indicating its captured image. Upon receiving the image signal from the camera 102, the ECU 100 applies a predetermined image processing to the image signal. The image processing determines the sex or the body shape of the occupant based on the image of the face of the occupant captured by the camera 102. The ECU 100 then acquires information on the sex or the body shape of the occupant as the occupant information by executing the image processing.

Note that, in the present embodiment, the sex of the occupant is determined from the captured image of the camera 102, however, the body shape of the occupant may be determined from the captured image of the camera 102.

Further, in the present embodiment, a proximity sensor 103 shown in FIG. 1 is provided in a part located behind the headrest pillars HP in the vehicle seat S. The proximity sensor 103 is configured as a known proximity sensor configured to measure a human skeletal shape. In the present embodiment, the proximity sensor 103 detects the skeletal shape of the neck of the occupant and outputs a signal indicating its detection result. Upon receiving the output signal from the proximity sensor 103, the ECU 100 identifies the skeletal shape detected by the proximity sensor 103 and acquires information on a shape of a predetermined part of the body of the occupant, for example, information on the skeletal shape of the neck, based on the identified result as the occupant information.

Note that, in the present embodiment, the information on the shape of the neck of the occupant is acquired based on the detection result (i.e., the skeletal shape of the neck) of the proximity sensor 103, however, the present embodiment is not limited thereto. Any measurement/detection results obtained by apparatuses other than the proximity sensor 103 may be used as long as the shape of the neck is appropriately acquired. For example, a measurement result obtained by a measuring instrument that measures a circumferential length of the neck of the occupant may be used.

Further, in the present embodiment, an input button 104 for the occupant information is provided in a space (e.g., a door panel) located near the vehicle seat S in the vehicle. The input button 104 is pushed by the occupant to specify his/her sex. In the present embodiment, one input button 104 is provided for each sex. The occupant then performs an operation of pushing one of two input buttons 104 according to his/her sex. In this manner, the input buttons 104 receive the button operation performed by the occupant and output a signal indicating a content based on the button operation. Upon receiving the output signal from the input buttons 104, the ECU 100 identifies which input buttons 104 are pushed and acquires information on the sex of the occupant based on the specified result as the occupant information.

Note that, in the present embodiment, only the input buttons 104 for determining the sex are provided, however, buttons for inputting other kinds of information on the occupant (e.g., age, height, weight, etc.) may be further provided. Further, in the present embodiment, input of the occupant information is performed by the button operation using the input buttons 104, however, the present embodiment is not limited thereto. For example, a lever for inputting the occupant information may be provided to allow an operation of moving the lever. Further, a cord or a strap for inputting the occupant information may be provided to allow an operation of pulling the cord or the strap. Further, a touch panel for inputting the occupant information may be provided to allow a touch input operation using the touch panel.

Next, the control by the ECU 100 is described. The ECU 100 controls the driving motor M and the pin driving device P according to the contents of the occupant information described above. In this manner, the states of the neck load lessening mechanisms that have been adjusted by the driving motor M and the pin driving device P can be changed according to the contents of the occupant information. Specifically, the reaching position of the headrest S3 moving forward in the event of the rear-end collision of the vehicle, the reaching position of the pressure receiving plate 14 moving backward in the event of the rear-end collision of the vehicle, and the limit deformation amount of the fragile portion 50 being deformed in the event of the rear-end collision of the vehicle are adjusted by the driving motor M and the pin driving device P.

On the other hand, the ECU 100 controls the driving motor M and the pin driving device P according to the contents of the acquired occupant information. This enables to set the above setting values (the reaching position of the headrest S3, the reaching position of the pressure receiving plate 14, and the limit deformation amount of the fragile portion 50) after adjustment to values according to the contents of the occupant information.

Figure 10:
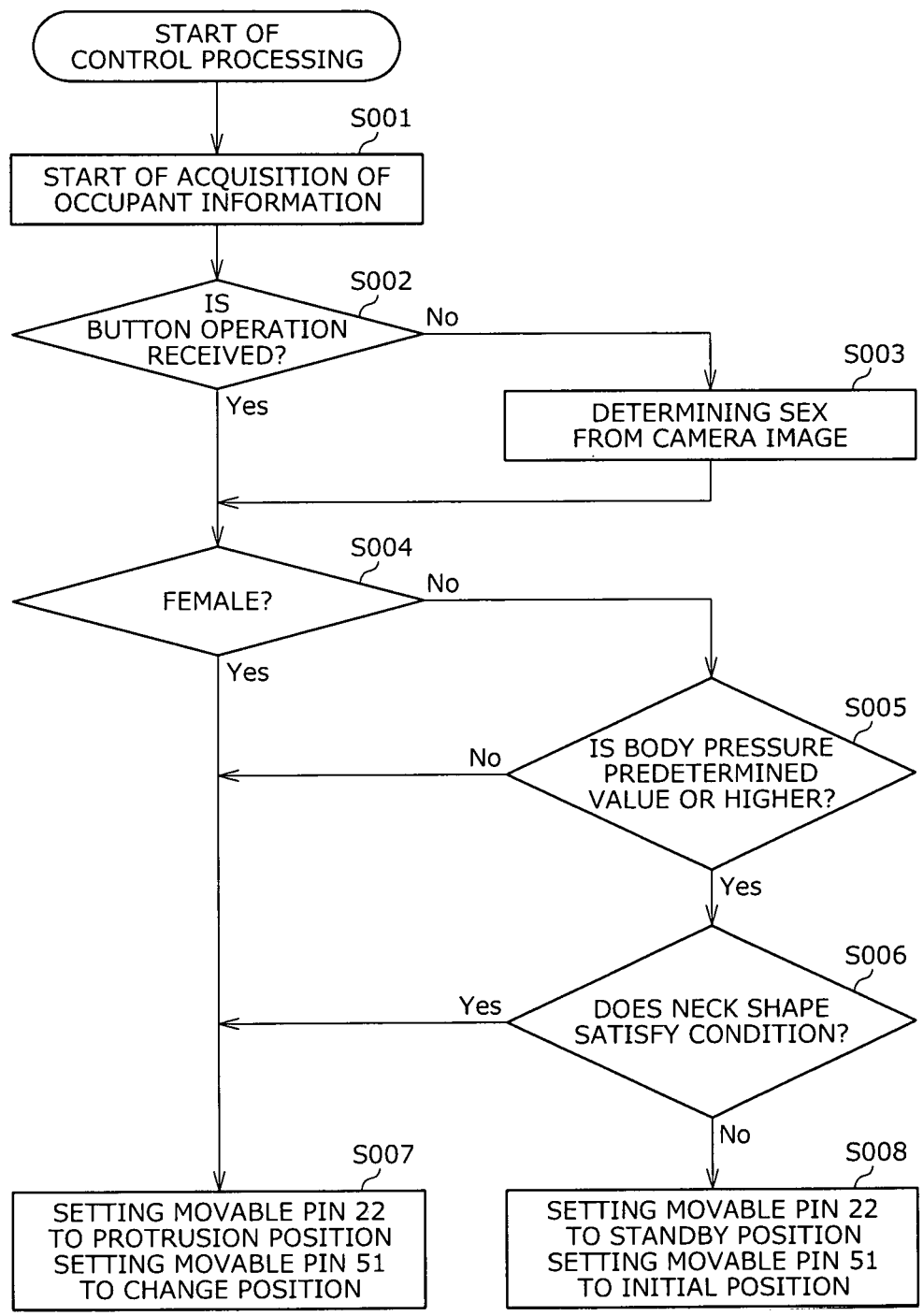
FIG. 10 is a diagram illustrating a flowchart of control processing performed by a control device, according to an embodiment.

Steps of the control processing executed by the ECU 100 are described below with reference to FIG. 10. The control processing is initiated when the occupant sits on the vehicle seat S as a trigger. After the control processing is initiated, the ECU 100 first starts to acquire the occupant information by the above-mentioned procedures (S001). Specifically, when the button operation using the input buttons 104 is received (Yes in S002), the ECU 100 determines the sex of the occupant by specifying which buttons are pushed. On the other hand, when the above button operation is not received (No in S002), the ECU 100 determines the sex of the occupant from the image captured by the camera 102 (S003).

Next, when the sex of the occupant is a female (Yes in S004), the ECU 100 controls the driving motor M and the pin driving device P to move the movable pin 22 and the movable pin 51, respectively. This allows the movable pin 22 to be set at the protrusion position and the movable pin 51 to be set at the change position (S007). In this case, the reaching position of the headrest S3 in the event of the rear-end collision of the vehicle is positioned more backward and the reaching position of the pressure receiving plate 14 is positioned more forward. Further, the limit deformation amount of the fragile portion 50 (in other words, the bending angle of the side frame 11) in the event of the rear-end collision of the vehicle becomes smaller.

In the present embodiment, when the occupant is a female as described above, the operation amounts of the neck load lessening mechanisms in the event of the rear-end collision of the vehicle are set smaller than the normal operation amounts. This is because the female neck is generally low in strength, and when the neck load lessening mechanisms are driven with the normal operation amounts in the event of the rear-end collision of the vehicle, there is a risk of excessively pushing the neck.

On the other hand, when the sex of the occupant is a male (No in S004), the ECU 100 determines whether the body pressure of the occupant identified from the detection result of the pressure sensor 101 has a predetermined value or higher (S005). In this step, the predetermined value is a predetermined threshold, specifically, a value set for determining whether the occupant has a large build or small build. Note that the above-mentioned threshold may be freely set.

Then, when the body pressure is less than the predetermined value (No in S005), the ECU 100 controls the driving motor M and the pin driving device P to move the movable pin 22 and the movable pin 51, respectively. This allows the movable pin 22 to be set at the protrusion position and the movable pin 51 to be set at the change position (S007). In this case, the reaching position of the headrest S3 in the event of the rear-end collision of the vehicle is positioned more backward and the reaching position of the pressure receiving plate 14 is positioned more forward. Further, the limit deformation amount of the fragile portion 50 in the event of the rear-end collision of the vehicle (in other words, the bending angle of the side frame 11) becomes smaller.

As described above, in the present embodiment, when the occupant has the small body pressure, that is, when the occupant has a small build, the operation amounts of the neck load lessening mechanisms in the event of the rear-end collision of the vehicle are set smaller than the normal operation amounts. This is because the neck of the human of a small build is generally low in strength, and when the neck load lessening mechanisms are driven with the normal operation amounts in the event of the rear-end collision of the vehicle, there is a risk of excessively pushing the neck.

On the other hand, when the body pressure is the predetermined value or higher (Yes in S005), the ECU 100 determines whether the shape of the neck of the occupant specified from the detection result of the proximity sensor 103 satisfies a predetermined condition (S006). In this step, the predetermined condition is a condition predetermined on the shape of the neck, specifically, a condition set for determining whether the shape of the neck has a strength lower than a predetermined level. Note that the above-mentioned condition may be set to any contents.

Then, when the shape of the neck satisfies the predetermined condition, that is, when the shape of the neck has a low strength (Yes in S006), the ECU 100 controls the driving motor M and the pin driving device P to move the movable pin 22 and the movable pin 51, respectively. This allows the movable pin 22 to be set at the protrusion position and the movable pin 51 to be set at the change position (S007). In this case, the reaching position of the headrest S3 in the event of the rear-end collision of the vehicle is positioned more backward and the reaching position of the pressure receiving plate 14 is positioned more forward. Further, the limit deformation amount of the fragile portion 50 in the event of the rear-end collision of the vehicle (in other words, the bending angle of the side frame 11) becomes smaller.

In contrast, when the shape of the neck does not satisfy the predetermined condition, that is, when the shape of the neck has a high strength (No in S006), the ECU 100 holds the driving motor M and the pin driving device P to their original positions (positions at the normal time). This causes the movable pin 22 to stay at the standby position and the movable pin 51 to stay at the initial position (S008). As a result, the neck load lessening mechanisms operate with the normal operation amounts in the event of the rear-end collision of the vehicle. Specifically, the reaching position of the headrest S3 moving forward is positioned more forward and the reaching position of the pressure receiving plate 14 moving backward is positioned more backward in the event of the rear-end collision of the vehicle. Further, the limit deformation amount of the fragile portion 50 (in other words, the bending angle of the side frame 11) in the event of the rear-end collision of the vehicle becomes larger.

As described above, in the present embodiment, when the occupant is a male of a large build and the shape of the neck does not satisfy the predetermined condition, the neck load lessening mechanisms operate with the normal operation amounts in the event of the rear-end collision of the vehicle. That is, when the strength of the neck is sufficiently ensured, the headrest S3, the pressure receiving plate 14, and the fragile portion 50, functioning as the neck load lessening mechanisms, operate with the original operation amounts.

As described above, according to the seat unit 1, the states of the neck load lessening mechanisms are adjusted according to the occupant information on the body and the sex of the occupant. Adjusting the states of the neck load lessening mechanisms in reflection of the sex, the body shape, or the like of the occupant in this manner enables to appropriately lessen the load applied to the neck of the occupant according to the sex, the body shape, or the like of that person in the event of the rear-end collision of the vehicle.

OTHER EMBODIMENTS

The embodiment described above is merely an example to facilitate understanding of the present disclosure and does not limit the present disclosure in any way. That is, the present disclosure can be changed and modified within the scope of the invention and encompasses equivalents thereof.

Further, in the embodiment described above, information on the body of the occupant and information on the sex of the occupant are both acquired as the occupant information. However, the present disclosure is not limited thereto, and it is only required to acquire at least one kind of information described above.

Further, in the embodiment described above, the headrest S3, the pressure receiving plate 14, and the fragile portion 50, all of which are arranged in the vehicle seat S, function as the neck load lessening mechanisms. However, the neck load lessening mechanisms are not limited to the above three, and any portions other than those may function as the neck load lessening mechanisms. States of such portions are appropriately adjusted according to the contents of the occupant information in the event of the rear-end collision of the vehicle.

Further, in the embodiment described above, the explanation is given of a case where the pressure receiving plate 14 is provided as an example of the movable member that is moved backward together with the back of the occupant by being pushed by the back of the occupant in the event of the rear-end collision of the vehicle. However, the movable member is not limited to the pressure receiving plate 14. In another example, an "S" spring 60 may be provided as the movable member. Below, a conveyance seat unit (hereinafter, a seat unit according to a modification) including the S spring 60 as the movable member is described with reference to FIG. 11 and FIG. 12. Note that, in FIGS. 11 and 12, equipment and components in the seat unit according to the modification common to the conveyance seat unit that has been already described (i.e., the seat unit 1) are designated by the same reference signs, and description of their configurations or the like is omitted.

Figure 11:
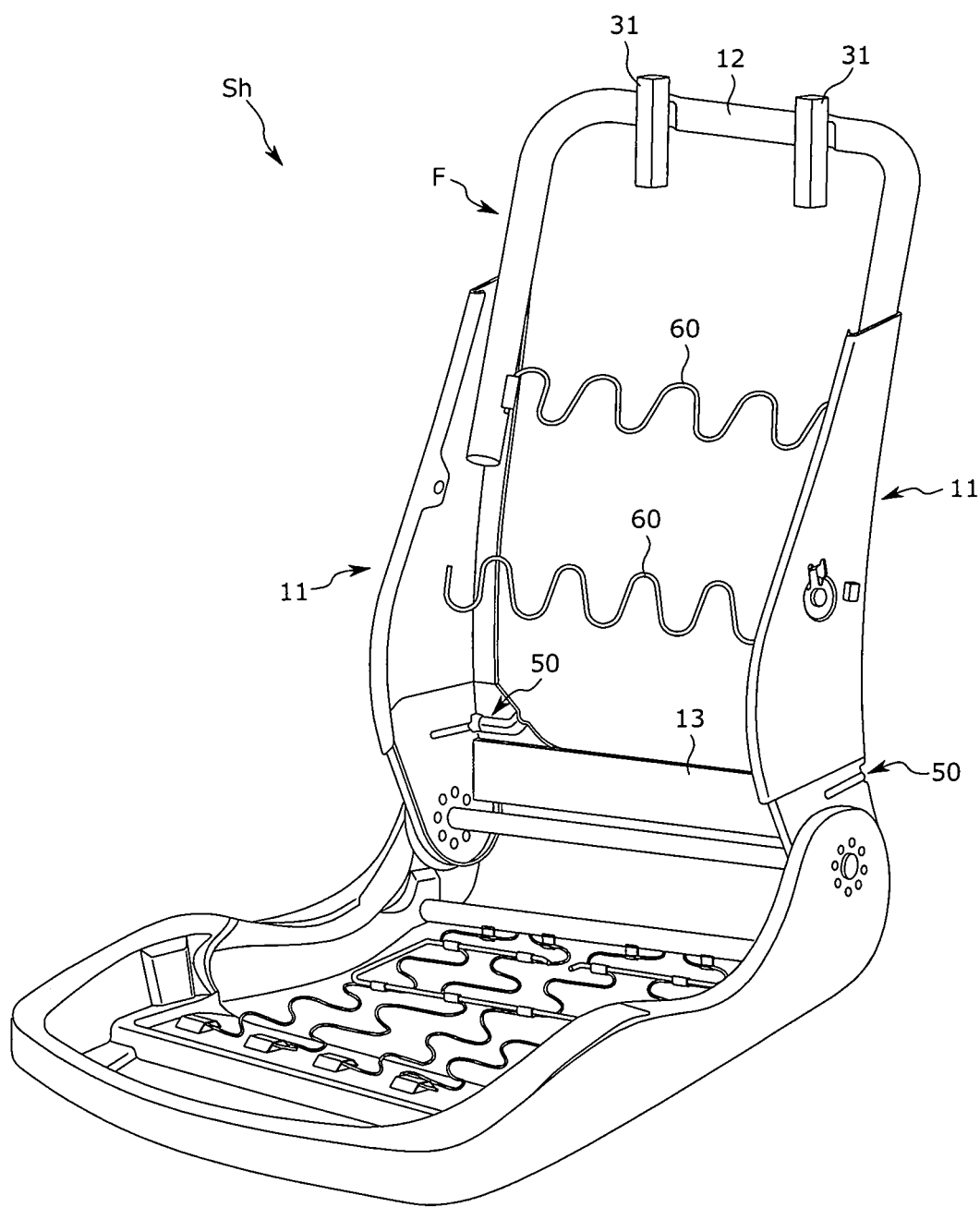
FIG. 11 is a perspective view illustrating a seat frame according to a modification.

As shown in FIG. 11, a vehicle seat Sh included in the seat unit according to the modification includes the S spring 60 extending in the width direction in the seat back S2 instead of the pressure receiving plate 14. The S spring 60 is stretched between the side frames 11, and in a configuration shown in FIG. 11, two S springs 60 are vertically aligned. The S springs 60 support the back of the occupant via the cushion pad (not illustrated) at the normal time. Further, when the rear load acts on the vehicle in the event of the rear-end collision of the vehicle or the like, the S springs 60 are deflected toward the back side in an arc shape by being pushed by the back of the occupant and moved backward together with the back of the occupant. That is, in the modification, the S springs 60 correspond to the rear-moving portion and a neck load adjustment portion that affects the load applied to the neck of the occupant in the seat back S2 in the event of the rear-end collision of the vehicle.

Figure 12:
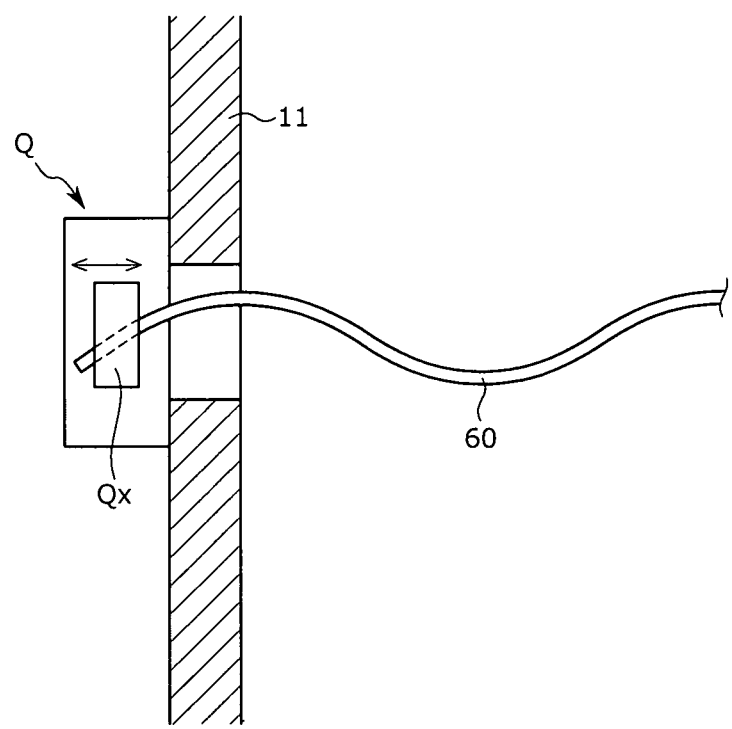
FIG. 12 is an enlarged schematic cross-sectional view illustrating an end portion in a width direction of a movable member and its surroundings according to a modification.

Further, both end portions in the width direction of each S spring 60 are hooked on the side frames 11. For example, among the both end portions in the width direction of each S spring 60, one end portion is hooked on a side wall of the side frame 11. As shown in FIG. 12, the other end portion is latched in a tension adjustment device Q assembled to the side frame 11. The tension adjustment device Q has a function to move, along the width direction, a portion on which the end portion in the width direction of the S spring 60 is hooked (hereinafter, referred to as a hooking portion Qx), thereby adjusting a tension degree of the S spring 60. The tension degree described herein represents a deflection amount of the S spring 60 per unit load, to put it simply, a concept that indicates susceptibleness to deformation of the S spring 60. That is, it is apparent that the tension adjustment device Q corresponds to the state adjustment mechanism that adjusts the tension degree as the state of the S spring 60.

Further, in the modification, the ECU 100 controls the tension adjustment device Q to change the tension degree of the S spring 60 after adjustment. More specifically, the ECU 100 acquires the occupant information on the body and the sex of the occupant, and, for example, when the occupant is a male of a relatively large build, the ECU 100 controls the tension adjustment device Q to keep the hooking portion Qx at the normal position. In this case, the tension degree of the S spring 60 is set to be a normal tension degree. Thus, when the S spring 60 is moved backward while being deflected in the event of the rear-end collision of the vehicle, the S spring 60 is deflected to the normal deflection amount and moved backward to a predetermined position.

On the other hand, when the occupant is a female or a male of a small build, the ECU 100 controls the tension adjustment device Q to move the hooking portion Qx to an outside in the width direction. In this case, the tension degree of the S spring 60 is set to be higher than the normal tension degree. Thus, when the S spring 60 is moved backward while being deflected in the event of the rear-end collision of the vehicle, the deflection amount of the S spring 60 is smaller than the normal deflection amount, and the reaching position of the S spring 60 is positioned more forward than the normal reaching position. As described above, even when the S spring 60 is used as the movable member, it becomes possible to appropriately lessen the load applied to the neck of the occupant in the event of the rear-end collision of the vehicle by appropriately changing the tension degree of the S spring 60 according to the sex and the body shape of the occupant.

TABLE OF REFERENCE NUMERALS

| | |
|---|---|
| 1: | Seat unit (Conveyance seat unit) |
| 11: | Side frame |
| 11a: | Through hole |
| 12: | Upper frame |
| 13: | Lower member frame |
| 14: | Pressure receiving plate (Rear-moving portion, Movable member) |
| 15: | Wire |
| 20: | Rotating member |
| 21: | Rear end tongue-shaped portion |
| 22: | Movable pin |
| 25: | Torsion spring |
| 30: | Pillar guide installation frame |
| 31: | Pillar guide |
| 32: | Coil spring |
| 36: | Link bracket |
| 37: | Shaft |
| 38: | Rotation support member |
| 39: | Shaft |
| 40: | Connection link |
| 50: | Fragile portion (Impact energy absorbing portion) |
| 51: | Movable pin |
| 60: | S spring (Rear-moving portion, Movable member) |
| 100: | ECU |
| 101: | Pressure sensor |
| 102: | Camera |
| 103: | Proximity sensor |
| 104: | Input button |
| F: | Seat back frame |
| HP: | Headrest pillar |
| M: | Driving motor (State adjustment mechanism) |
| P: | Pin driving device (State adjustment mechanism) |
| Q: | Tension adjustment device (State adjustment mechanism) |
| Qx: | Hooking portion |
| S, Sh: | Vehicle seat (Conveyance seat) |
| S1: | Seat cushion, |
| S2: | Seat back |
| S3: | Headrest |

The invention claimed is:

1. A conveyance seat unit for a conveyance, the conveyance seat unit comprising:
a conveyance seat configured to support a seated occupant of the conveyance, the conveyance seat being provided with a seat back for supporting a back of the occupant from behind;

a neck load adjustment portion that is provided in the seat back of the conveyance seat and affects a neck load applied to a neck of the occupant when a rear load acts on the conveyance;
a state adjustment mechanism configured to adjust a state of the neck load adjustment portion;
an acquisition portion configured to acquire occupant information on the occupant by more than one different sensor; and
a control device configured to control the state adjustment mechanism according to a content of the occupant information acquired by the acquisition portion to change the state of the neck load adjustment portion, which has been adjusted by the state adjustment mechanism, according to the content, wherein:
the neck load adjustment portion includes an impact energy absorbing portion configured to absorb impact energy by being deformed when the rear load acts on the conveyance;
the state adjustment mechanism adjusts a limit deformation amount of the impact energy absorbing portion; and
the control device changes the limit deformation amount, which has been adjusted by the state adjustment mechanism, according to the content.

2. The conveyance seat unit according to claim 1, wherein the impact energy absorbing portion is a fragile portion formed in a seat back frame located inside the seat back, and is deformed to provide a bending starting point of the seat back frame when the rear load acts on the conveyance.

3. The conveyance seat unit according to claim 1, wherein the acquisition portion includes a camera and a pressure sensor.

4. The conveyance seat unit according to claim 1, wherein the acquisition portion includes a camera and a proximity sensor.

5. The conveyance seat unit according to claim 1, wherein:
the conveyance seat comprises a seat cushion for supporting buttocks of the occupant and a headrest for supporting a head of the occupant;
the seat back includes a seat back frame inside the seat back;
the seat back frame comprises:
a pair of side frames that are arranged in a seat width direction;
an upper frame that couples upper end portions of the pair of side frames;
a lower member frame that couples lower end portions of the pair of side frames; and
a pressure receiving plate that are arranged between the pair of side frame.

6. The conveyance seat unit according to claim 1, wherein the neck load adjustment portion further includes a rear-moving portion configured to be moved backward together with the back of the occupant by being pushed by the back of the occupant.

7. The conveyance seat unit according to claim 6, wherein the rear-moving portion includes a movable member that is moved backward together with the back of the occupant by being pushed by the back of the occupant when the rear load acts on the conveyance.

8. The conveyance seat unit according to claim 7, wherein:
the state adjustment mechanism is configured to adjust a reaching position of the movable member moving backward as the state of the movable member; and the control device is configured to change the reaching position, which has been adjusted by the state adjustment mechanism, according to the content.

9. The conveyance seat unit according to claim 8, wherein:
the movable member is moved backward together with the back of the occupant while being deflected by being pushed by the back of the occupant when the rear load acts on the conveyance;
the conveyance seat unit further comprises a second state adjustment mechanism configured to adjust a deflection amount of the movable member per unit load; and
the control device changes the deflection amount of the movable member, which has been adjusted by the second state adjustment mechanism, according to the content.

10. A conveyance seat unit for a conveyance, the conveyance seat unit comprising:
a conveyance seat configured to support a seated occupant of the conveyance, the conveyance seat being provided with a seat back for supporting a back of the occupant from behind;
a neck load adjustment portion that is provided in the seat back of the conveyance seat and affects a neck load applied to a neck of the occupant when a rear load acts on the conveyance;
a state adjustment mechanism configured to adjust a state of the neck load adjustment portion;
an acquisition portion configured to acquire occupant information on at least one of a body and a sex of the occupant; and
a control device configured to control the state adjustment mechanism according to a content of the occupant information acquired by the acquisition portion to change the state of the neck load adjustment portion, which has been adjusted by the state adjustment mechanism, according to the content, wherein:
the neck load adjustment portion is a rear-moving portion that is moved backward together with the back of the occupant by being pushed by the back of the occupant.

11. A conveyance seat unit for a conveyance, the conveyance seat unit comprising:
a conveyance seat configured to support a seated occupant of the conveyance, the conveyance seat being provided with a seat back for supporting a back of the occupant from behind;
a neck load adjustment portion that is provided in the seat back of the conveyance seat and affects a neck load applied to a neck of the occupant when a rear load acts on the conveyance;
a state adjustment mechanism configured to adjust a state of the neck load adjustment portion;
an acquisition portion configured to acquire occupant information on at least one of a body and a sex of the occupant; and
a control device configured to control the state adjustment mechanism according to a content of the occupant information acquired by the acquisition portion to change the state of the neck load adjustment portion, which has been adjusted by the state adjustment mechanism, according to the content, wherein:
the neck load adjustment portion is an impact energy absorbing portion configured to absorb impact energy by being deformed when the rear load acts on the conveyance; and
the impact energy absorbing portion is a fragile portion formed in a seat back frame located inside the seat back, and is deformed to provide a bending starting point of the seat back frame when the rear load acts on the conveyance.

* * * * *